(12) United States Patent
Leonardi et al.

(10) Patent No.: US 12,655,893 B2
(45) Date of Patent: Jun. 16, 2026

(54) SYSTEM AND METHOD FOR REDUCING LOAD FLUCTUATIONS IN PROPELLER-DRIVEN MACHINES

(71) Applicants: Board of Regents, The University of Texas System, Austin, TX (US); Stefano Leonardi, Richardson, TX (US); David Dooner, Mayaguez, PR (US)

(72) Inventors: Stefano Leonardi, Richardson, TX (US); David Dooner, Mayaguez, PR (US)

(73) Assignees: Board of Regents, The University of Texas System, Austin, TX (US); University of Puerto Rico, San Juan, PR (US)

( * ) Notice: Subject to any disclaimer, the term of this patent is extended or adjusted under 35 U.S.C. 154(b) by 0 days.

(21) Appl. No.: 18/838,886

(22) PCT Filed: Feb. 14, 2023

(86) PCT No.: PCT/US2023/062556

§ 371 (c)(1),
(2) Date: Aug. 15, 2024

(87) PCT Pub. No.: WO2023/159004

PCT Pub. Date: Aug. 24, 2023

(65) Prior Publication Data

US 2025/0155006 A1      May 15, 2025

Related U.S. Application Data

(60) Provisional application No. 63/310,388, filed on Feb. 15, 2022.

(51) Int. Cl.
*F16H 35/00*      (2006.01)
*F03D 17/00*      (2016.01)

(52) U.S. Cl.
CPC ........... *F16H 35/00* (2013.01); *F03D 17/033* (2023.08); *F16H 2035/003* (2013.01)

(58) Field of Classification Search
None
See application file for complete search history.

(56) References Cited

U.S. PATENT DOCUMENTS 2,957,363 A      10/1960   Brewer et al.
3,585,874 A  *   6/1971    Ingham ................. F16H 55/084
                                                              74/393

(Continued)

FOREIGN PATENT DOCUMENTS

GB           800307 A      8/1958

OTHER PUBLICATIONS

PCT Search Report and Written Opinion, dated Aug. 1, 2023, regarding Application No. PCT/US23/62556, 15 pages.

*Primary Examiner* — Juan G Flores
(74) *Attorney, Agent, or Firm* — Yee & Associates, P.C.

(57) ABSTRACT

An apparatus for attenuating or counterbalancing external load fluctuations on a propeller driver machine is disclosed. In one embodiment a set of non-circular gears coupled to a rotor shaft or to the gearbox of the machine are further coupled to an auxiliary flywheel. The shapes and inertial characteristics of the non-circular gears and the inertial characteristics of the auxiliary flywheel are designed to counterbalance cyclic load fluctuations experienced by the rotor shaft. In another embodiment, an inertial element is flexibly attached to a rotor shaft by a set of flexible elements of the machine wherein the moment of inertia of the inertial element and the stiffness of the flexible elements are selected to absorb and attenuate external load fluctuations on the rotor shaft. The propeller driven machine may be a HAWG (Continued)

type wind turbine and the external load fluctuations caused by wind shear and tower shadowing effects.

15 Claims, 9 Drawing Sheets

(56)                    References Cited

U.S. PATENT DOCUMENTS

| 3,955,428 | A | * | 5/1976 | Ward | F16H 33/08 |
| | | | | | 74/64 |
| 5,381,766 | A | | 1/1995 | Sakita | |
| 2017/0045119 | A1 | * | 2/2017 | Rodriguez Ramirez | F03B 13/142 |

* cited by examiner

EXISTING TORQUE FLUCTUATION

AUXILIARY TORQUE FLUCTUATION

NET TORQUE FLUCTUATION

500 — IN A GEARBOX OF A PROPELLER DRIVEN MACHINE, COUNTERBALANCING OR ATTENUATING A LOAD FLUCTUATION IN SAID PROPELLER DRIVEN MACHINE TO IMPROVE THE RELIABILITY OF SAID PROPELLER DRIVEN MACHINE

FIG. 5A

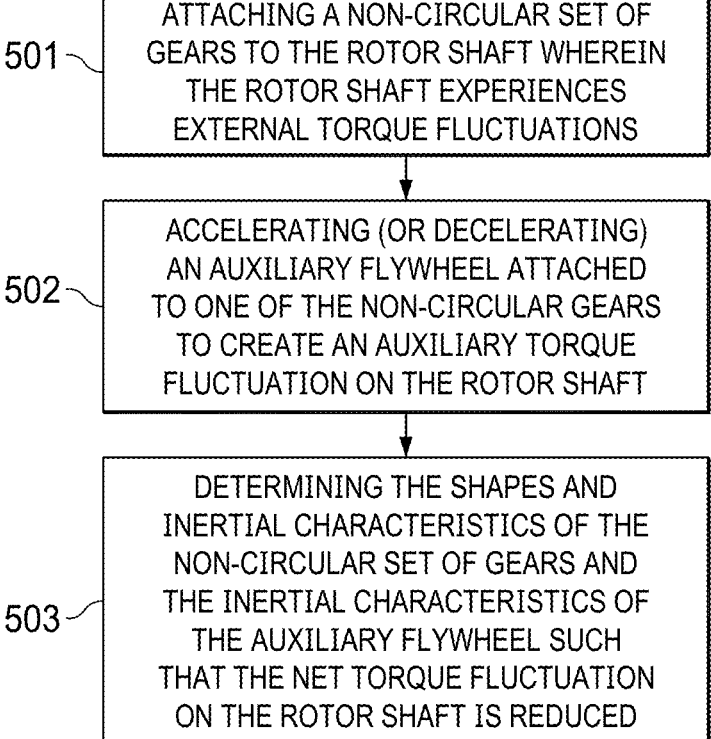

501 — ATTACHING A NON-CIRCULAR SET OF GEARS TO THE ROTOR SHAFT WHEREIN THE ROTOR SHAFT EXPERIENCES EXTERNAL TORQUE FLUCTUATIONS

502 — ACCELERATING (OR DECELERATING) AN AUXILIARY FLYWHEEL ATTACHED TO ONE OF THE NON-CIRCULAR GEARS TO CREATE AN AUXILIARY TORQUE FLUCTUATION ON THE ROTOR SHAFT

503 — DETERMINING THE SHAPES AND INERTIAL CHARACTERISTICS OF THE NON-CIRCULAR SET OF GEARS AND THE INERTIAL CHARACTERISTICS OF THE AUXILIARY FLYWHEEL SUCH THAT THE NET TORQUE FLUCTUATION ON THE ROTOR SHAFT IS REDUCED

FIG. 5B

510⌇ ADDING AN INTERNALLY GENERATED
TORQUE FLUCTUATION TO A ROTOR
SHAFT OF A PROPELLER DRIVEN MACHINE
TO COUNTERBALANCE OR ATTENUATE
AN EXTERNAL LOAD FLUCTUATION
EXPERIENCED BY THE ROTOR SHAFT

FIG. 5C

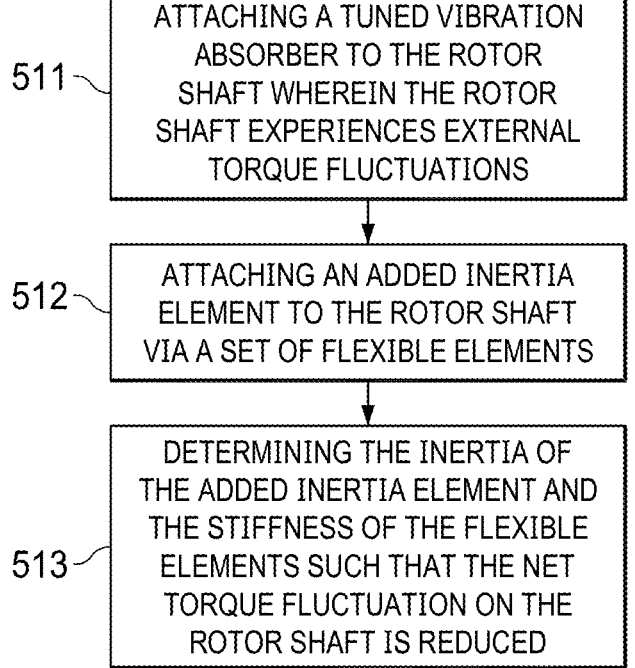

511⌇ ATTACHING A TUNED VIBRATION
ABSORBER TO THE ROTOR
SHAFT WHEREIN THE ROTOR
SHAFT EXPERIENCES EXTERNAL
TORQUE FLUCTUATIONS

512⌇ ATTACHING AN ADDED INERTIA
ELEMENT TO THE ROTOR SHAFT
VIA A SET OF FLEXIBLE ELEMENTS

513⌇ DETERMINING THE INERTIA OF
THE ADDED INERTIA ELEMENT AND
THE STIFFNESS OF THE FLEXIBLE
ELEMENTS SUCH THAT THE NET
TORQUE FLUCTUATION ON THE
ROTOR SHAFT IS REDUCED

FIG. 5D

SYSTEM AND METHOD FOR REDUCING LOAD FLUCTUATIONS IN PROPELLER-DRIVEN MACHINES

STATEMENT OF GOVERNMENT INTEREST

This invention was made with partial government support under Grant No. 1243482 awarded by the National Science Foundation. The government has certain rights in the invention.

BACKGROUND INFORMATION

1. Field

This disclosure relates to method of managing load fluctuations inherent in tower mounted HAWT (Horizontal Axis Wind Turbines), including auxiliary components that counterbalance or attenuate external load fluctuations. The concepts herein are applicable to rotating machines in general.

2. Background

Wind turbines are used to generate electrical power from wind energy. Gearbox failures are common today in wind turbines due to uneven torque loading.

Therefore, it would be desirable to have an apparatus and system that take into account at least some of the issues discussed above, as well as other possible issues.

SUMMARY

An illustrative embodiment provides an apparatus for balancing external load fluctuations experienced by a propeller driven machine, wherein the propeller driven machine is driven by a rotor shaft connected to a set of propellers. The apparatus comprises: a first rotatable shaft; an auxiliary flywheel rigidly connected to the first rotatable shaft; a first non-circular gear rigidly connected to the first rotatable shaft; a second rotatable shaft; and a second non-circular gear rigidly connected to the second rotatable shaft; wherein the first non-circular gear and the second non-circular gear are mechanically engaged to rotate in tandem; and wherein the second rotatable shaft is driven at an angular speed n times the angular speed of the rotor shaft.

Another illustrative embodiment provides an apparatus for balancing external load fluctuations experienced by a propeller driven machine, wherein the propeller driven machine is driven by a rotor shaft connected to a set of propellers. The apparatus comprises: a first rotatable shaft; an auxiliary flywheel rigidly connected to the first rotatable shaft; a first non-circular gear rigidly connected to the first rotatable shaft; and a second non-circular gear rigidly connected to the rotor shaft; wherein the first non-circular gear and the second non-circular gear are mechanically engaged to rotate in tandem; and wherein the second rotatable shaft is driven at an angular speed n times the angular speed of the rotor shaft.

Another illustrative embodiment provides a tuned vibration absorber for attenuating external torque fluctuations experienced by a wind turbine, wherein the wind turbine is driven by a rotor shaft connected to a propeller apparatus, the tuned vibration absorber comprising an inertial element connected by a set of flexible elements to the rotor shaft.

Another illustrative embodiment provides a method for attenuating external torque fluctuations experienced by a rotor shaft of a propeller driven machine, the method comprising the step of accelerating an auxiliary flywheel coupled to the rotor shaft to create an auxiliary torque fluctuation on the rotor shaft that counters the external torque fluctuation.

Another illustrative embodiment provides a method for attenuating external torque fluctuations experienced by a wind turbine, the method comprising the step of coupling a tuned vibration absorber to the rotor shaft wherein the tuned vibration absorber adds an auxiliary torque fluctuation on the rotor shaft that absorbs and attenuates the external torque fluctuation.

Another illustrative embodiment provides an apparatus for balancing external load fluctuations experienced by a propeller driven machine, wherein the propeller driven machine is driven by a rotor shaft connected to a set of propellers. The apparatus comprises: a first rotatable shaft; a first non-circular gear rigidly connected to the first rotatable shaft; a second rotatable shaft; a second non-circular gear rigidly connected to the second rotatable shaft; wherein the first non-circular gear and the second non-circular gear are mechanically engaged to rotate in tandem; and wherein the second rotatable shaft is driven at an angular speed n times the angular speed of the rotor shaft.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5A is a flowchart for a process of counterbalancing or attenuating external load fluctuations of a wind turbine in accordance with the present invention;

FIG. 5B is a flowchart for a process of counterbalancing load fluctuations of a wind turbine in accordance with the present invention;

FIG. 5C is a flowchart for a process of applying internal torque fluctuation to attenuated external load fluctuations of a wind turbine in accordance with the present invention; and FIG. 5D is a flowchart for a process of attenuating torque fluctuations of a wind turbine in accordance with the present invention.

US 12,655,893 B2

3

DETAILED DESCRIPTION

The illustrative embodiments recognize and take into account that wind turbines are used to generate electrical power from wind energy. The illustrative embodiments also recognize and take into account that gearbox failures are common today in wind turbines due to uneven torque loading.

The illustrative embodiments provide a method to modulate the torque on the wind turbine rotor shaft to even the torque load in the wind turbine.

Figure 1:
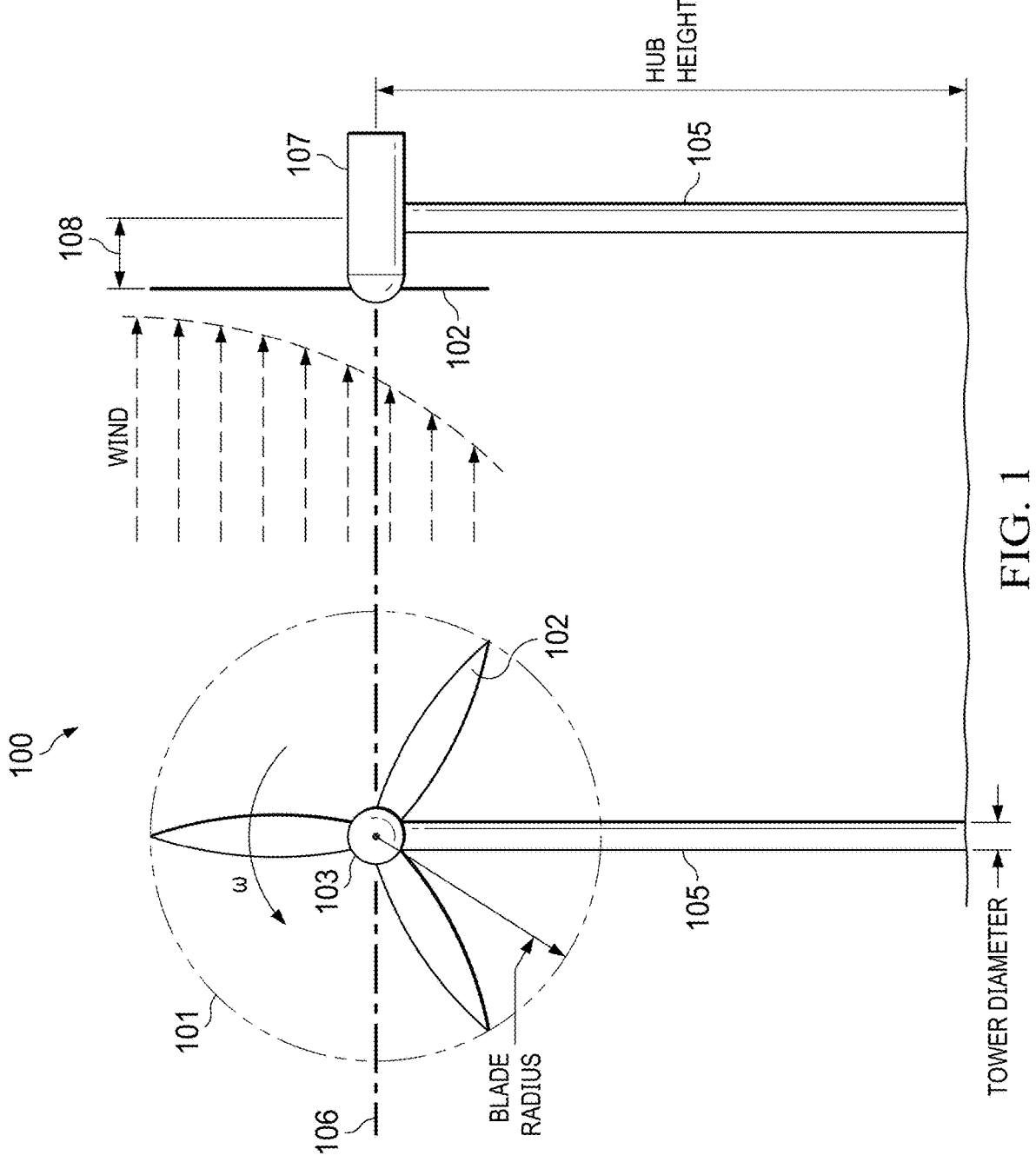
FIG. 1 is a schematic diagram of a wind turbine.

FIG. 1 is a schematic diagram of a wind turbine. A typical rotor assembly for a wind turbine of the kind described above weighs about 4,000 pounds. The hub weighs approximately 1,000 pounds and each of the three blades mounted to the hub weighs about 1,000 pounds. The total weight of the turbine nacelle including the rotor assembly is on the order of 12,000-20,000 pounds depending on the dimensions of the rotor. In the current state of art, manufacturers are producing turbines with rotor diameters of the order of 300 ft.

The aerodynamic efficiency of the blade is, in general, maximized at a tip speed ratio (TSR=ωR/U, where ω is the rotational speed of the rotor, R is the radius of the rotor and U is the wind speed) in the range TSR=6-7. This results, for a turbine with a diameter D=100 m (300 ft), and a wind speed of 10 m/s (22 mph) to about 12-15 revolutions per minute or about 0.2 Hz. Smaller turbines (for example D=50 m (150 ft)) rotate faster (about 20-30) revolutions per minute.

Figure 2:
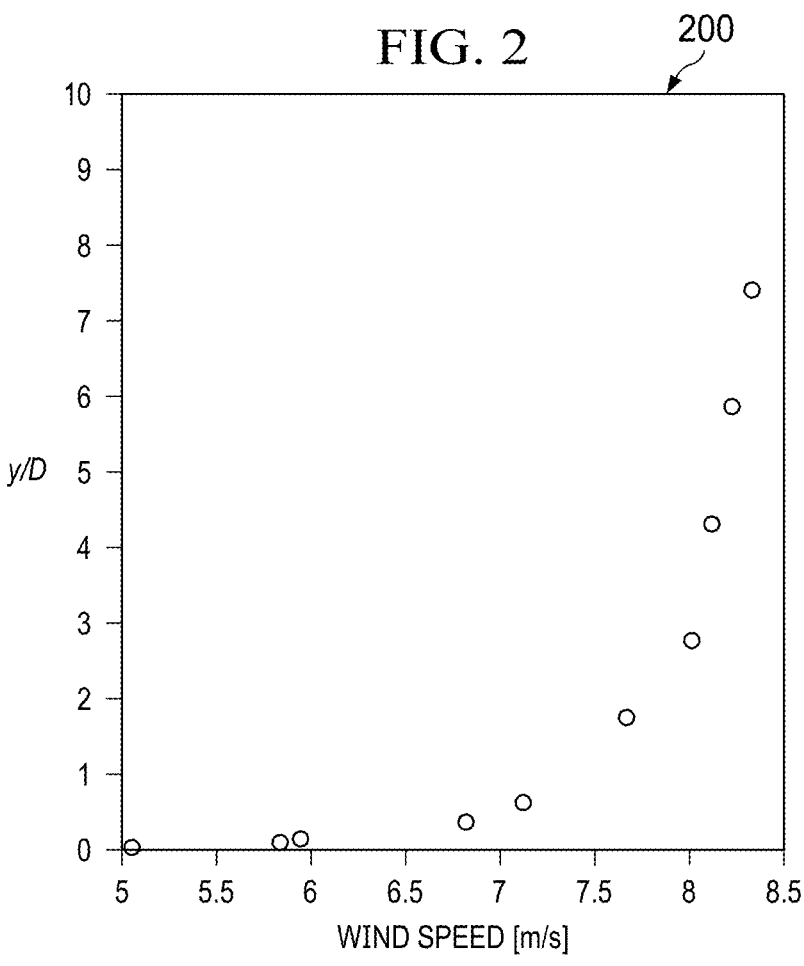
FIG. 2 is a plot of a velocity profile as measured at the SWiFT site of DoE.

Wind loads on a wind turbine vary as the turbine blades rotate due to the wind shear. As shown in the graph 200 of FIG. 2, the wind speed is not uniform. This varying wind speed results in a cyclic load variation on the rotor during each revolution. Also, the phenomenon of "tower shadow effects" exists causing a rapid change in rotor load as the blades pass by the tower. Topography can also induce velocity fluctuations, veer (change of wind direction in the vertical direction) and as a consequence torque fluctuations.

The fluctuations repeat for each cycle of the blades about their axis of rotation. A turbine, which in general has a life of approximated 20 years, undergoes approximately 200 to 300 million revolutions. Since the rotor has 3 blades the gearbox is subject to about 600-900 million cycles in 20 years (current designs aim to last 30 years). The combination of wind shear and tower shadow effects result in a cyclic load fluctuation which reduces the life of bearings and gears thereby reducing the overall life of the turbine. Reduction of cyclic load fluctuations can also help with voltage/current regulation while generating electric power.

The novel methodology is disclosed herein where an auxiliary load fluctuation is generated to counterbalance an unwanted load fluctuation that can exist in a wind turbine. The novel methodology may be applied to rotating machines generally.

Figure 3A:
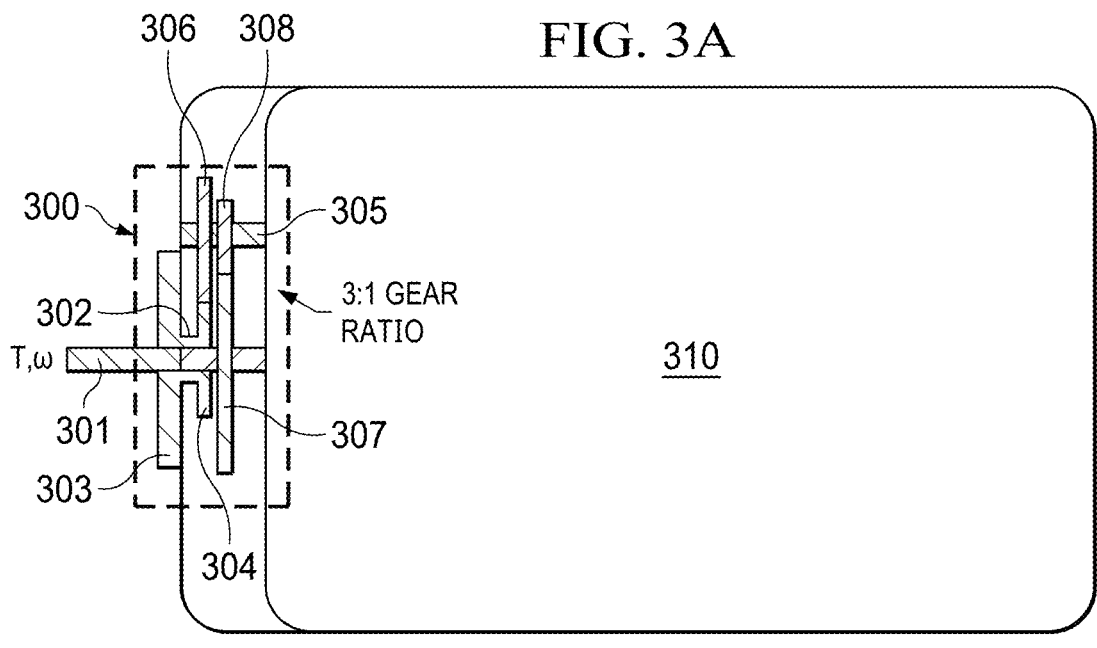
FIG. 3A is a schematic diagram of a non-circular gear pair and flywheel coupled to a gearbox according to an embodiment of the present invention.
Figure 3B:
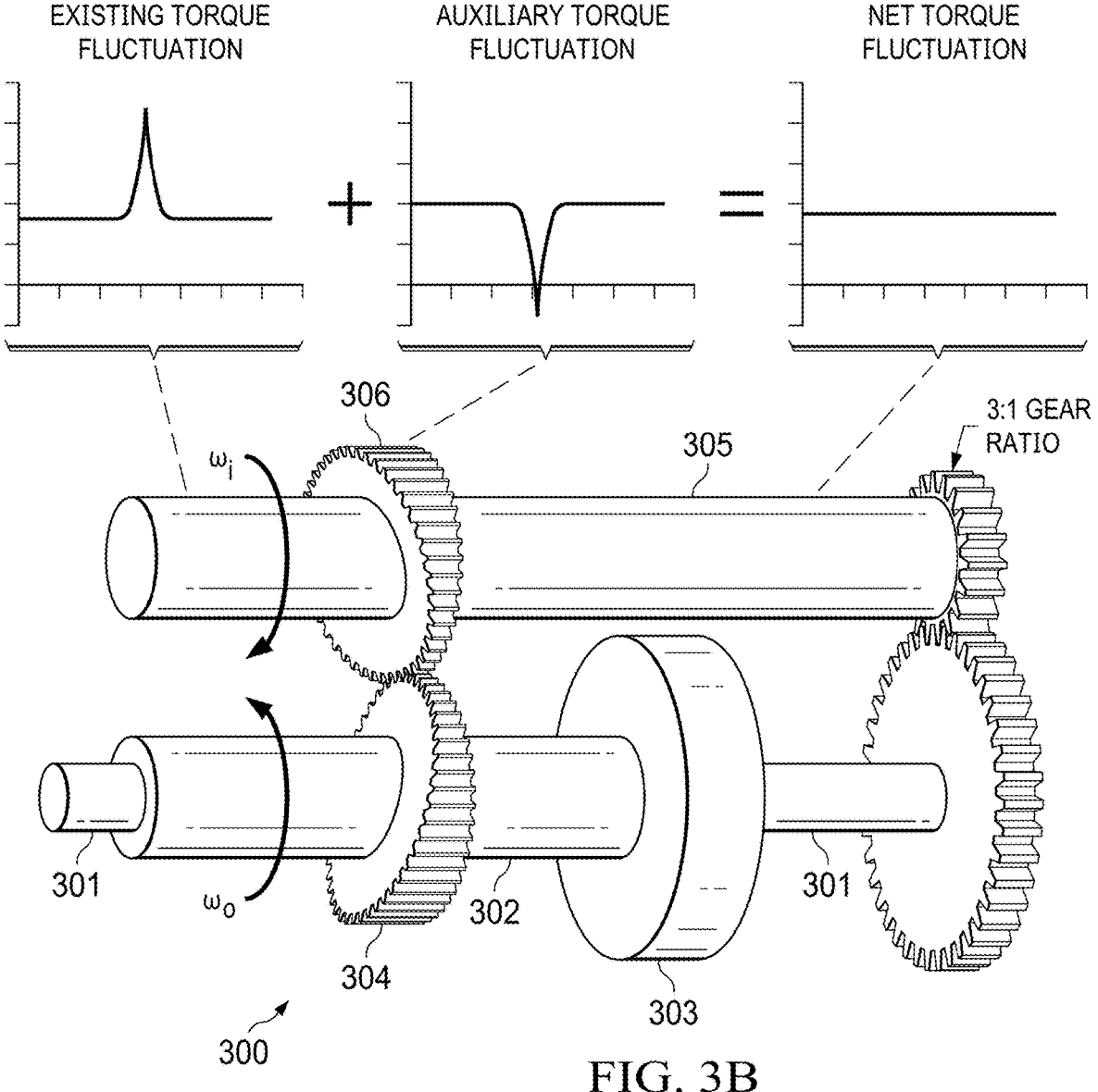
FIG. 3B is a schematic diagram of a load balancing assembly including a non-circular gear pair and flywheel according to an embodiment of the present invention.

An embodiment that applies the novel methodology is shown in FIGS. 3A and 3B, where a load balancing assembly comprising a non-circular gear pair is used to accelerate and decelerate an auxiliary flywheel creating an auxiliary torque fluctuation. FIG. 3A is a schematic drawing of load balancing assembly 300 attached to a gearbox 310 of a propeller-driven system which is typical for HAWT systems, wherein rotor shaft 301 couples the wind turbine blades and hub directly to gearbox 310 input. In some embodiments, rotor shaft 301 may rotate independently of load balancing assembly 300 when not attached to gearbox 310. FIG. 3B is a schematic drawing of a configuration of non-circular gears of the load balancing assembly 300.

According to FIGS. 3A and 3B, non-circular gear assembly 300 is attached between a rotor hub (not shown) and a gearbox 310 in a wind turbine nacelle. Load balancing assembly 300 comprises an input non-circular gear 306 rigidly connected to an input shaft 305. Load balancing assembly further comprises an output non-circular gear 304 rigidly connected to auxiliary shaft 302 wherein non-circular gear 304 is in contact with and engaged with non-circular gear 306. An auxiliary flywheel 303 is rigidly connected to auxiliary shaft 302 and non-circular gear 304. Auxiliary shaft 302 is coaxial with rotor shaft 301. For example, in one embodiment, auxiliary shaft 302 is a cylindrical shaped sleeve concentric with rotor shaft 301 rotating independently of rotor shaft 301.

Input shaft 305 rotates at angular speed $\omega_i$ while output shaft 302, non-circular gear 304, and flywheel 303 rotate at angular speed $\omega_O$. In FIG. 3A, a circular gear 307 is rigidly connected to rotor shaft 301 and another circular gear 308 is rigidly connected to input shaft 305. Circular gears 307 and 308 are engaged so that their relative angular speeds are determined according to the ratio of their diameters, wherein the angular speed of 301 is related to the angular speed of 305 by a ratio of n:1. In one embodiment, n correlates to the number of wind turbine blades. For example, n=3 is selected for a three-blade wind turbine.

Figure 3C:
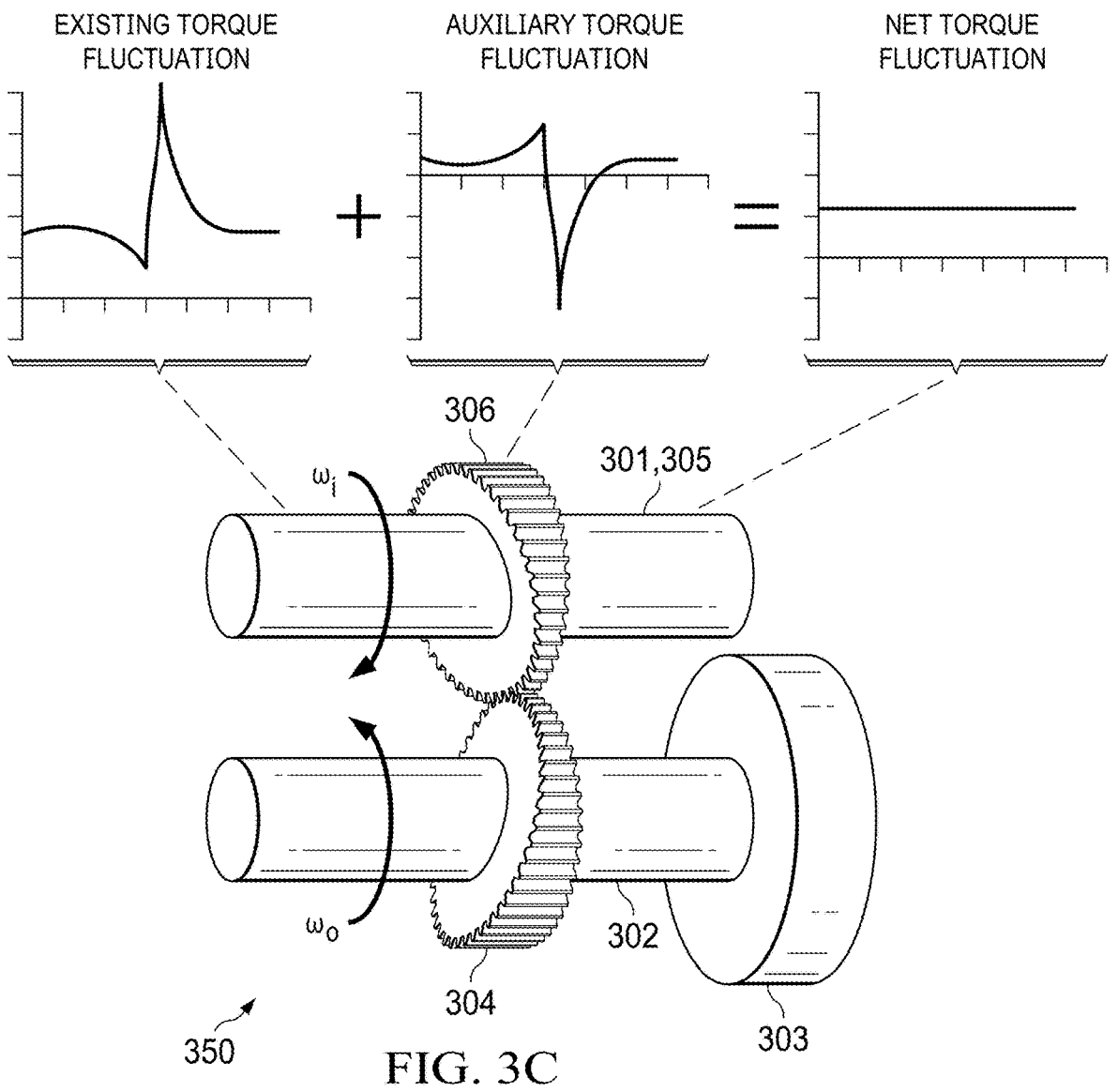
FIG. 3C is a schematic diagram of a load balancing assembly including a non-circular gear pair and flywheel according to another embodiment of the present invention.

In some embodiments, circular gears 307 and 308 are not required in the load balancing assembly as shown in FIG. 3A. Rather, the input shaft 305 and main shaft 301 are the same and the relative diameters of non-circular gears 306 and 304 determine a net speed reduction of n:1 as shown in the load balancing assembly 350 of FIG. 3C. In other embodiments input shaft 305 may be coupled to gearbox 310 and the angular speed of the input shaft 305 governed by a transmission function internal to gearbox 310.

Rotor shaft 301 experiences existing external torque fluctuations. Non-circular gears 304 and 306 are both non-circular and may also be non-uniform in thickness. In one embodiment, the shape of the existing external torque fluctuation is used to determine the shape of the non-circular gear pair that couples the rotating wind turbine to the auxiliary flywheel. In other embodiments, a non-uniform thickness of the non-circular gears is modulated and or other inertial characteristics of the non-circular gears are modulated to counterbalance the existing external torque fluctuation.

Figure 3D:
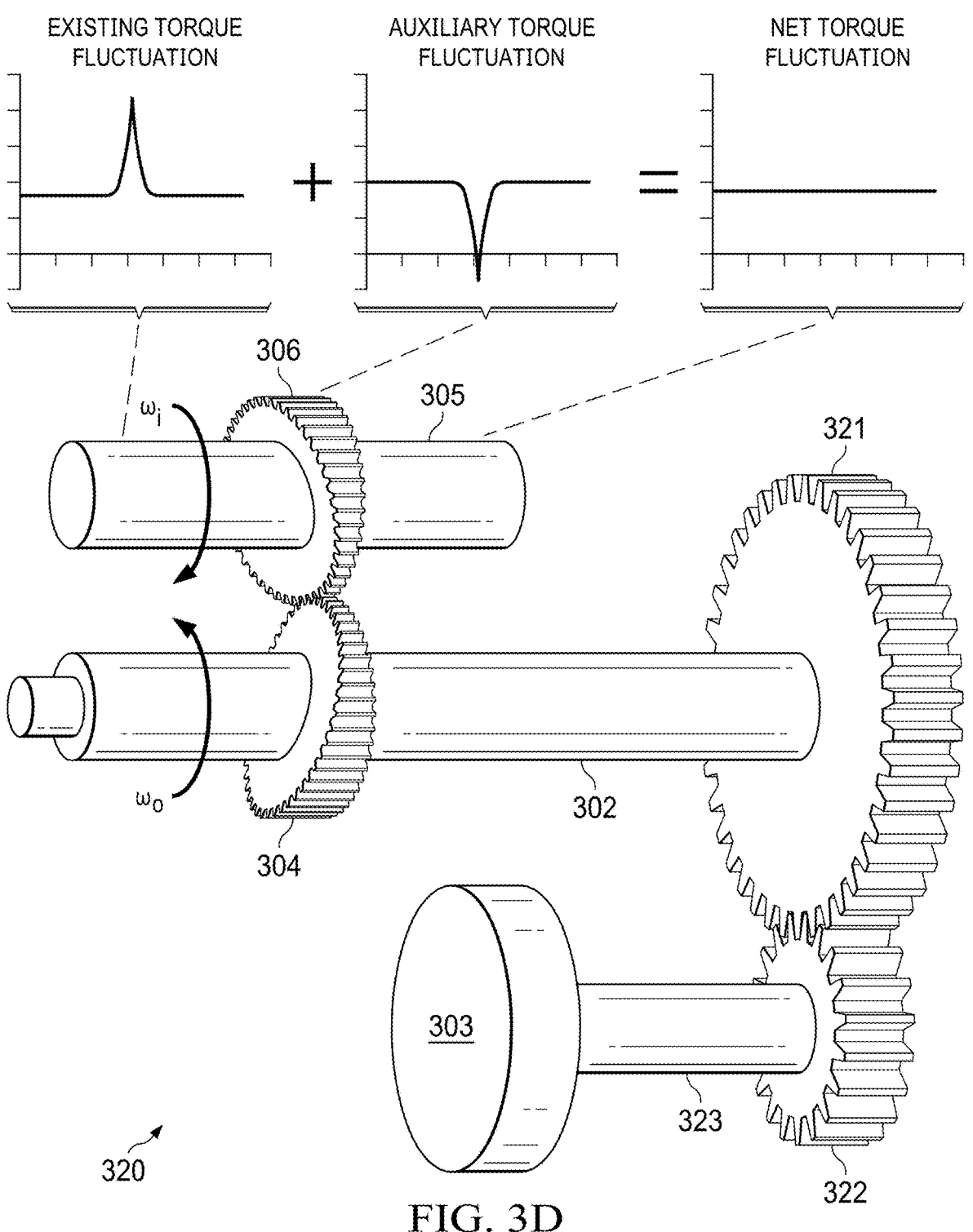
FIG. 3D is a schematic diagram of a load balancing assembly including a non-circular gear pair and flywheel according to another embodiment of the present invention.

In the embodiment of FIGS. 3A and 3B, the auxiliary flywheel has the same angular speed as non-circular gear 304. In other embodiments, the auxiliary flywheel does not rotate at the same angular speed as non-circular gear 304. For example, referring to FIG. 3D, a load balancing assembly 320 is shown where auxiliary flywheel 303 is indirectly coupled to auxiliary shaft 302 via circular gears 321 and 322. Circular gear 321 is rigidly attached to auxiliary shaft 302. Circular gear 322 is rigidly attached to auxiliary flywheel 303 by shaft 323. The ratio of the circular gears 321 and 322 determine the angular speed of the auxiliary flywheel.

Figure 3E:
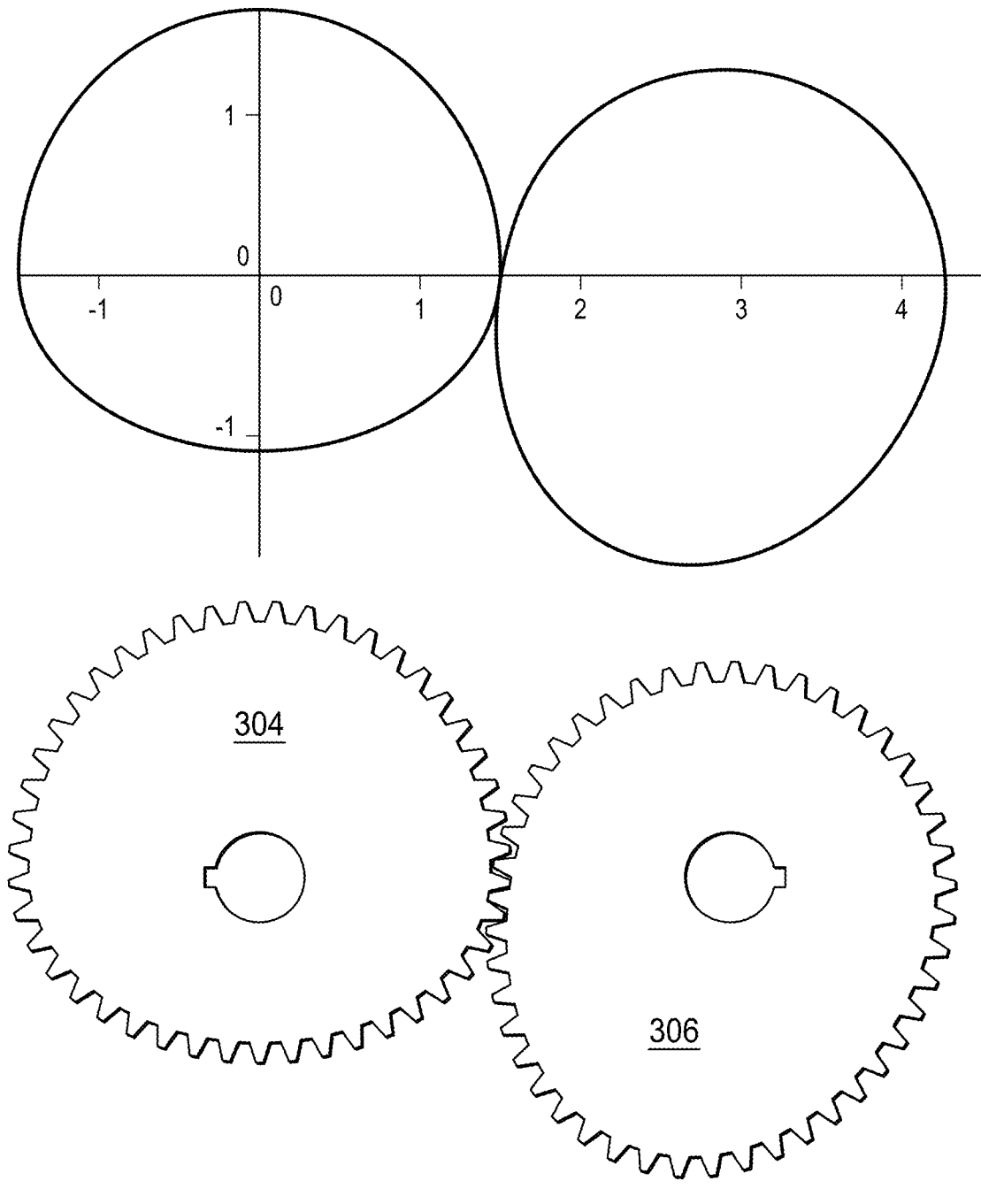
FIG. 3E is a schematic diagram showing representative shapes of a non-circular gear pair according to another embodiment of the present invention.

FIG. 3E is a schematic diagram of the input and output non-circular gear shapes determined according to an analysis such as that which follows in relations to equations (1)-(4). The existing external torque fluctuation and the auxiliary torque fluctuation are added together to reduce the net torque fluctuation transmitted to the gearbox and generator in a wind turbine.

From the conservation of energy, the power supplied to the system plus the power extracted from the system equals the rate at which power is being stored in the system:

$$T_i \omega_i + T_o \omega_o = \frac{d}{dt}\left(\frac{1}{2} I_i \omega_i^2 + \frac{1}{2} I_o \omega_o^2\right), \qquad \text{eq. (1)}$$

where $\omega_i$, $T_i$ and $I_i$ are the angular speed, torque, and mass moment of inertia of the input, where $\omega_o$, $T_o$ and $I_o$ those relative to the output. Variation in $T_i$ is the cyclic torque fluctuation experienced by the turbine. To eliminate the cyclic torque fluctuation, we impose $\dot{\omega}=0$; Since the output shaft is free to rotate $T_o=0$ and our goal is to have $T_i$=const and $\omega_i$=const, equation (1) reduces to $$T_i \omega_i = \frac{d}{dt}\left(\frac{1}{2} I_o \omega_o^2\right), \qquad \text{eq. (2)}$$

Using a prime to designate the geometrical derivative with respect to the angular position $v_i$ of the input, the above relationship can be rearranged as $$T_i \omega_i = I_o \omega_o \frac{d(\omega_o)}{dt} = I_o g \omega_i \frac{d(g\omega_i)}{dt} = \qquad \text{eq. (3)}$$

$$I_o g \omega_i^2 \frac{d(g)}{dt} = I_o g \omega_i^2 \frac{d(g)}{dv_i}\frac{dv_i}{dt} = I_o g \omega_i^3 \frac{d(g)}{dv_i} = I_o g g' \omega_i^3$$

$$\left(\frac{T_i}{I_o \omega_i^2}\right) = g g' = g \frac{dg}{dv_i} = \frac{dv_o}{dv_i}\frac{d^2 v_o}{dv_i^2} = v_o'' v_o' \qquad \text{eq. (4)}$$

In the above expression, the term in the parenthesizes is a scaling factor and is speed dependent. In order to determine the transmission function for the non-circular gear pair, the angular position of the output $v_o$ $f(v_i)$ is obtained by solving the above $2^{nd}$ order non-linear ODE (Ordinary Differential Equation).

One boundary condition to be satisfied is that the initial position of the output is aligned with the initial input position such that $v_o(0)=0$ and a second boundary condition is that the final position is $v_o(2\pi)=2$ (one revolution of the input non-circular gear yields one revolution of the output non-circular gear).

Another novel methodology is disclosed where an auxiliary load fluctuation is generated to attenuate load fluctuations that exist in a wind turbine.

Figure 4:
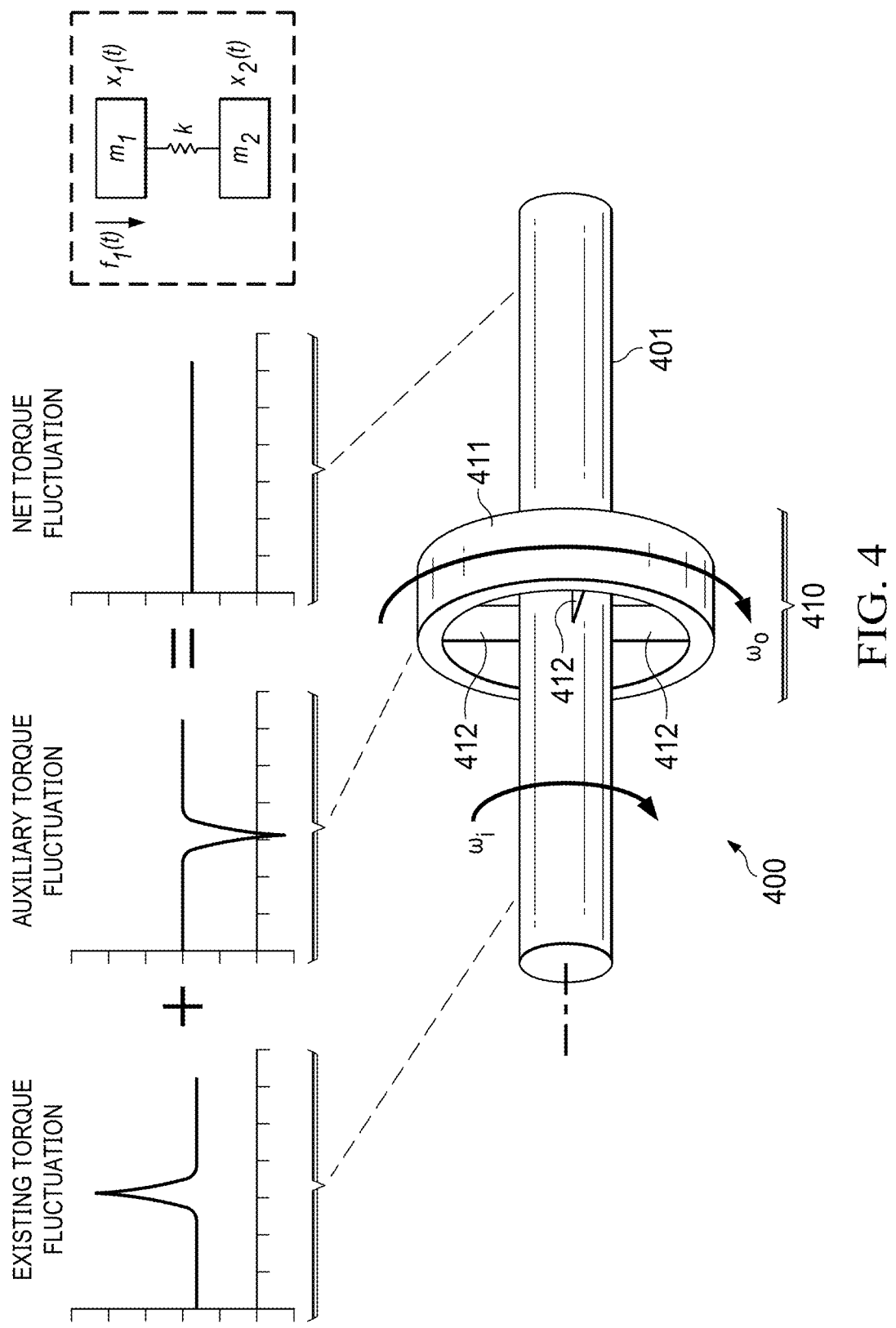
FIG. 4 is a schematic diagram of a tuned vibration absorber for a wind turbine according to an embodiment of the present invention.

In another embodiment, auxiliary load fluctuations are generated to attenuate unwanted load fluctuations that are inherent in rotating shafts of wind turbines due to wind shear, tower shadowing, surrounding topography, and/or a turbine's location within a wind farm. An example of the alternative embodiment is illustrated in FIG. 4 wherein a tuned vibration absorber model 410 on a rotor shaft 401 of a wind turbine is introduced. Rotor shaft 401 is further connected to a gearbox (not shown). Tuned vibration absorber 410 comprises an inertial element 411 attached to rotor shaft 401 by a set of flexible elements 412. Flexible elements 412 flex relative to a central longitudinal axis of rotor shaft 401. Flexible elements 412 may be made of, e.g., steel, other metals, alloys, carbon fibers, polymers, rubber, etc., or a combination thereof. The inset in FIG. 4 is an illustration of a tuned vibration absorber model consisting of inertia element $m_1$ together with an added inertia element $n_2$. $m_1$ represents the inertia of the existing wind turbine and rotor shaft; $m_2$ represents the added inertia of the tuned vibration absorber 411, $m_2$ being connected to $m_1$ via flexible elements with stiffness k. Values $m_2$ and k are selected to reduce torque variations.

In another embodiment, each wind turbine within a wind farm can have a customized load mitigation mechanism comprising of non-circular gears of embodiment X1, tuned vibration absorber of embodiment X2, or a combination of embodiments X1 and X2.

According to the methodology summarized in FIGS. 5A-5D, reducing load fluctuations experienced by a rotor shaft in a gearbox of a wind turbine can potentially reduce the size of the gearbox, increase reliability and extend the life of the gearbox, and reduce the cost of Operations and Maintenance (O&M), the Levelized Replacement cost (LRC), and consequently the overall cost of energy produced by the wind turbine:

$$COE = \frac{ICC * FCR + LRC}{AEP} + O\&M, \qquad \text{eq. (5)}$$

where COE is the cost of energy ($/kWh), ICC is the initial capital cost ($), FCR is the fixed charge rate (%/year) and AEP is the annual energy production (kWh/year).

According to step 500 of FIG. 5A, the reliability of a propeller drive machine such as a wind turbine is improved by counterbalancing or attenuating external load fluctuations of the wind turbine. According to the steps 501-503 of FIG. 5B, a method for counterbalancing the load fluctuations is disclosed. In step 501, a non-circular set of gears is attached to the rotor shaft of the propeller driven machine, the rotor shaft experiencing external torque (or load) fluctuations. In step 502, an auxiliary flywheel is attached to one of the non-circular gears to create an auxiliary torque fluctuation on the rotor shaft. In step 503, the shapes and inertial characteristics of the non-circular set of gears and the inertial characteristics of the auxiliary flywheel are determined so that the net torque fluctuation on the rotor shaft is reduced (as for example in equations (1)-(4) and explanation given above).

According to step 510 of FIG. 5C, external load fluctuations experienced by the rotor shaft of a propeller driven machine such as a wind turbine are attenuated by the addition of (or an application of) an internally generated torque fluctuation. According to the steps 511-513 of FIG. 5D, a method for attenuating torque fluctuations on the rotor shaft of the propeller driven machine is disclosed. In step 511, a tuned vibration absorber is attached to the rotor shaft. In step 512, a particular type of tuned vibration absorber is applied to the rotor shaft by attaching an added inertia element to the rotor shaft via a set of flexible elements. In step 513, the inertia of the added inertia element and the stiffness of the flexible elements are determined so as to reduce the net torque fluctuation on the rotor shaft.

In the methods of FIGS. 5A-5D, the non-circular gear shapes, the inertia of the added inertia element and the stiffness of the flexible elements may be determined by empirically measuring torque fluctuations experienced by a rotor shaft or by calculating expected torque fluctuations experienced by a rotor shaft. Robust methods of modeling loads on the rotor shaft match experimentally measured values of external fluctuating loads. The external fluctuating loads determined via mathematical modeling can be quantified. Where the propeller driven machine is an HAWG type wind turbine, two such external fluctuating loads consists of wind shear and tower effects.

In additional steps, the disclosed torque balancing concept may be integrated into new gearboxes or retrofitted to existing gearboxes.

The illustrations provided by the disclosed embodiments that reduce the torque load on the bearings and other rotor components in the FIGS. 2-5 are not meant to imply physical or architectural limitations to the manner in which an illustrative embodiment may be implemented. For example, the illustrations herein were given in relation to a HAWG type wind turbine, however, the novel load balancing concepts may be applied to other types of wind turbines and propeller-driven machines. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The descriptions of the various embodiments of the present invention have been presented for purposes of illustration, but are not intended to be exhaustive nor is the present invention limited to the embodiments disclosed. Many modifications and variations will be apparent to those of ordinary skill in the art without departing from the scope and spirit of the described embodiment. The terminology used herein was chosen to best explain the principles of the embodiments, the practical application or technical improvement over technologies found in the marketplace, or to enable others of ordinary skill in the art to understand the embodiments disclosed here.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Some features of the illustrative examples are described in the following clauses. These clauses are examples of features not intended to limit other illustrative examples.

Clause 1

An apparatus for balancing external load fluctuations experienced by a propeller driven machine, wherein the propeller driven machine is driven by a rotor shaft connected to a set of propellers, the apparatus comprising:

a first rotatable shaft;

an auxiliary flywheel rigidly connected to the first rotatable shaft;

a first non-circular gear rigidly connected to the first rotatable shaft;

a second rotatable shaft; and a second non-circular gear rigidly connected to the second rotatable shaft;

wherein the first non-circular gear and the second non-circular gear are mechanically engaged to rotate in tandem; and wherein the second rotatable shaft is driven at an angular speed n times the angular speed of the rotor shaft.

Clause 2

The apparatus of clause 1, where n is the number of propellers in the set of propellers.

Clause 3

The apparatus of clause 1, where n is the periodicity of load fluctuations experienced by the propeller driven system.

Clause 4

The apparatus of clause 1, further comprising a first gear rigidly attached to the rotor shaft and a second gear rigidly attached to the second rotatable shaft; wherein the ratio of the relative size of the first gear to the second gear determines the angular speed of the second rotatable shaft in relation to the angular speed of the rotor shaft.

Clause 5

The apparatus of clause 1, further comprising a gearbox, wherein:

the rotor shaft is coupled to the input of the gearbox;

the second rotatable shaft is coupled to an output of the gearbox; and a transmission function of the gearbox determines the angular speed of the second rotatable shaft in relation to the angular speed of the rotor shaft.

Clause 6

The apparatus of clause 1, wherein the shape of the first and second non-circular gears cause an applied auxiliary torque on the rotor shaft that counterbalances the external load fluctuations on the propeller driven machine while operating.

Clause 7

The apparatus of clause 6, where that ratio n:1 is set by the timing of the applied auxiliary torque as required to counterbalance the external load fluctuations.

Clause 8

The apparatus of clause 6, wherein the propeller driven machine is a HAWG type wind turbine and wherein the external load fluctuations are due to wind shear and tower shadowing effects.

Clause 9

The apparatus of clause 1, wherein:
the first rotatable shaft is a cylindrical sleeve concentric to the rotor shaft;
the cylindrical sleeve moves independently of the rotor shaft; and
the flywheel is concentric to the rotor shaft.

Clause 10

An apparatus for balancing external load fluctuations experienced by a propeller driven machine, wherein the propeller driven machine is driven by a rotor shaft connected to a set of propellers, the apparatus comprising:
a first rotatable shaft;
an auxiliary flywheel rigidly connected to the first rotatable shaft;
a first non-circular gear rigidly connected to the first rotatable shaft; and
a second non-circular gear rigidly connected to the rotor shaft;
wherein the first non-circular gear and the second non-circular gear are mechanically engaged to rotate in tandem; and
wherein the second rotatable shaft is driven at an angular speed n times the angular speed of the rotor shaft.

Clause 11

A tuned vibration absorber for attenuating external torque fluctuations experienced by a wind turbine, wherein the wind turbine is driven by a rotor shaft connected to a propeller apparatus, the tuned vibration absorber comprising an inertial element connected by a set of flexible elements to the rotor shaft.

Clause 12

The apparatus of clause 11 wherein the inertial element is a toroid.

Clause 13

The apparatus of clause 11 wherein $m_1$ is the inertia of the rotor shaft and propeller apparatus; $m_2$ is the added moment of inertia of the inertial element and k is the stiffness of the flexible elements and wherein the values of $m_2$ and k are selected to cause the tuned vibration absorber to reduce the external torque fluctuations.

Clause 14

The apparatus of any of the clauses 11-13 wherein the wind turbine is a HAWG type wind turbine and wherein the external torque fluctuations are due to wind shear and tower shadowing effects.

Clause 15

A method for attenuating external torque fluctuations experienced by a rotor shaft of a propeller driven machine, the method comprising the step of accelerating an auxiliary flywheel coupled to the rotor shaft to create an auxiliary torque fluctuation on the rotor shaft that counters the external torque fluctuation.

Clause 16

The method of clause 15 wherein the step of acceleration includes positive and negative angular accelerations.

Clause 17

The method of clause 15 further comprising the steps of:
coupling a set of non-circular gears to the rotor shaft; and
rigidly attaching the auxiliary flywheel to a non-circular gear of the set of non-circular gears.

Clause 19

The method of clause 15 further comprising the steps of:
coupling a set of non-circular gears to the rotor shaft; and
indirectly coupling the auxiliary flywheel to a non-circular gear of the set of non-circular gears so that the auxiliary flywheel rotates an angular speed different than the angular speed of the non-circular gear.

Clause 19

The method of clause 18 further comprising the step of determining the shapes of the set of non-circular gears and the inertial characteristics of the auxiliary flywheel such that the net torque fluctuations on the rotor shaft is reduced.

Clause 20

The method of clause 15 further comprising the step of determining the inertial characteristics of the auxiliary flywheel such that the net torque fluctuations on the rotor shaft is reduced.

Clause 21

A method for attenuating external torque fluctuations experienced by a wind turbine, the method comprising the step of coupling a tuned vibration absorber to the rotor shaft wherein the tuned vibration absorber adds an auxiliary torque fluctuation on the rotor shaft that absorbs and attenuates the external torque fluctuation.

Clause 22

The method of clause 21 further comprising the steps of:
coupling an added inertial element to the rotor shaft by a set of flexible elements; and,
selecting the moment of inertia of the added inertial elements and the stiffness of the flexible elements to cause an absorption of the external torque fluctuations thereby reducing the net torque fluctuation on the rotor shaft.

Clause 23

An apparatus for balancing external load fluctuations experienced by a propeller driven machine, wherein the propeller driven machine is driven by a rotor shaft connected to a set of propellers, the apparatus comprising:
a first rotatable shaft;
a first non-circular gear rigidly connected to the first rotatable shaft;
a second rotatable shaft;
a second non-circular gear rigidly connected to the second rotatable shaft;

wherein the first non-circular gear and the second non-circular gear are mechanically engaged to rotate in tandem; and wherein the second rotatable shaft is driven at an angular speed n times the angular speed of the rotor shaft.

Clause 24

The apparatus of clause 23 further comprising:

a first circular gear rigidly connected to the first rotatable shaft; and a second circular gear rigidly connected to an auxiliary flywheel;

wherein the first circular gear and the second circular gear are mechanically engaged to rotate in tandem; and wherein the relative sizes of the first circular gear and the second circular gear determine the angular speed of the auxiliary flywheel.

Clause 25

The apparatus of clause 23 further comprising an auxiliary flywheel rigidly connected to the first rotatable shaft.

Clause 26

The apparatus of clause 23 further comprising an auxiliary flywheel indirectly coupled to the rotor shaft so as to rotate at the angular speed of the second non-circular gear.

Clause 27

The apparatus of clause 23 further comprising an auxiliary flywheel indirectly coupled to the rotor shaft so as to rotate at an angular speed different than the angular speed of the second non-circular gear.

What is claimed is:

1. A propeller driven machine comprising:
a rotor shaft connected to a set of propellers;
wherein the propeller driven machine is driven by the rotor shaft;
an apparatus for balancing external load fluctuations experienced by the propeller driven machine, the apparatus comprising:
a first rotatable shaft;
an auxiliary flywheel rigidly connected to the first rotatable shaft;
a first non-circular gear rigidly connected to the first rotatable shaft;
a second rotatable shaft; and
a second non-circular gear rigidly connected to the second rotatable shaft;
wherein the first non-circular gear and the second non-circular gear are mechanically engaged to rotate in tandem; and
wherein the second rotatable shaft is driven at an angular speed n times an angular speed of the rotor shaft.

2. The propeller driven machine of claim 1, where n is a number of propellers in the set of propellers.

3. The propeller driven machine of claim 1, where n is a periodicity of load fluctuations experienced by the propeller driven machine.

4. The propeller driven machine of claim 1, further comprising a first gear rigidly attached to the rotor shaft and a second gear rigidly attached to the second rotatable shaft; wherein a ratio of a relative size of the first gear to the second gear determines the angular speed of the second rotatable shaft in relation to the angular speed of the rotor shaft.

5. The propeller driven machine of claim 1, further comprising a gearbox, wherein:
the rotor shaft is coupled to the input of the gearbox;
the second rotatable shaft is coupled to an output of the gearbox; and
a transmission function of the gearbox determines the angular speed of the second rotatable shaft in relation to the angular speed of the rotor shaft.

6. The propeller driven machine of claim 1, wherein the shape of the first and second non-circular gears cause an applied auxiliary torque on the rotor shaft that counterbalances the external load fluctuations on the propeller driven machine while operating.

7. The apparatus of claim 6, wherein the first and second non-circular gears accelerate and decelerate the auxiliary flywheel to generate the applied auxiliary torque, wherein fluctuation of the applied auxiliary torque is timed to counterbalance the external load fluctuations.

8. The propeller driven machine of claim 6, wherein the propeller driven machine is a HAWG type wind turbine and wherein the external load fluctuations are due to wind shear and tower shadowing effects.

9. The propeller driven machine of claim 1, wherein:
the first rotatable shaft is a cylindrical sleeve concentric to the rotor shaft;
the cylindrical sleeve moves independently of the rotor shaft; and
the flywheel is concentric to the rotor shaft.

10. A propeller driven machine comprising:
a rotor shaft connected to a set of propellers;
wherein the propeller driven machine is driven by the rotor shaft;
an apparatus for balancing external load fluctuations experienced by the propeller driven machine, the apparatus comprising:
a first rotatable shaft;
an auxiliary flywheel rigidly connected to the first rotatable shaft;
a first non-circular gear rigidly connected to the first rotatable shaft; and
a second non-circular gear rigidly connected to the rotor shaft;
wherein the first non-circular gear and the second non-circular gear are mechanically engaged to rotate in tandem; and
wherein a second rotatable shaft is driven at an angular speed n times an angular speed of the rotor shaft.

11. A propeller driven machine comprising:
a rotor shaft connected to a set of propellers;
wherein the propeller driven machine is driven by the rotor shaft;
an apparatus for balancing external load fluctuations experienced by the propeller driven machine, the apparatus comprising:
a first rotatable shaft;
a first non-circular gear rigidly connected to the first rotatable shaft;
a second rotatable shaft;
a second non-circular gear rigidly connected to the second rotatable shaft;
wherein the first non-circular gear and the second non-circular gear are mechanically engaged to rotate in tandem; and wherein the second rotatable shaft is driven at an angular speed n times an angular speed of the rotor shaft.

12. The propeller driven machine of claim 11 further comprising:

a first circular gear rigidly connected to the first rotatable shaft; and a second circular gear rigidly connected to an auxiliary flywheel;

wherein the first circular gear and the second circular gear are mechanically engaged to rotate in tandem; and wherein relative sizes of the first circular gear and the second circular gear determine an angular speed of the auxiliary flywheel.

13. The propeller driven machine of claim 11 further comprising an auxiliary flywheel rigidly connected to the first rotatable shaft.

14. The propeller driven machine of claim 11 further comprising an auxiliary flywheel indirectly coupled to the rotor shaft so as to rotate at an angular speed of the second non-circular gear.

15. The propeller driven machine of claim 11 further comprising an auxiliary flywheel indirectly coupled to the rotor shaft so as to rotate at an angular speed different than an angular speed of the second non-circular gear.

* * * * *